(12) United States Patent
Lin et al.

(10) Patent No.: US 9,188,707 B2
(45) Date of Patent: Nov. 17, 2015

(54) OPTICAL LENS WITH ANTI-REFLECTION FILM AND LENS MODULE

(75) Inventors: Juin-Hong Lin, New Taipei (TW);
Tai-Sheng Tsai, New Taipei (TW);
Shih-Che Chien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 538 days.

(21) Appl. No.: 13/585,753

(22) Filed: Aug. 14, 2012

(65) Prior Publication Data

US 2013/0057950 A1    Mar. 7, 2013

(30) Foreign Application Priority Data

Sep. 7, 2011    (TW) .............................. 100132214 A (51) Int. Cl.
*G02B 13/14*    (2006.01)
*G02B 1/115*    (2015.01)
*G02B 7/02*    (2006.01)

(52) U.S. Cl.
CPC ................ *G02B 1/115* (2013.01); *G02B 7/022* (2013.01)

(58) Field of Classification Search
None
See application file for complete search history.

(56) References Cited

U.S. PATENT DOCUMENTS

| | | | | |
|---|---|---|---|---|
| 7,924,501 | B2 * | 4/2011 | Chen et al. | 359/359 |
| 8,090,250 | B2 * | 1/2012 | Lusinchi | 396/89 |
| 2004/0233823 | A1 | 11/2004 | Ohta | |
| 2008/0231957 | A1 * | 9/2008 | Terayama | 359/586 |
| 2009/0032098 | A1 * | 2/2009 | Lu | 136/257 |
| 2009/0080077 | A1 * | 3/2009 | Lin | 359/586 |
| 2009/0168184 | A1 * | 7/2009 | Yamada et al. | 359/601 |

FOREIGN PATENT DOCUMENTS

| | | |
|---|---|---|
| CN | 1573361 A | 2/2005 |
| CN | 101271166 A | 9/2008 |
| CN | 101419332 A | 4/2009 |
| CN | 101750641 A | 6/2010 |
| CN | 101937109 A | 1/2011 |
| CN | 201883039 U | 6/2011 |
| TW | 200619824 A | 6/2006 |
| TW | 200946950 A | 11/2009 |

* cited by examiner

*Primary Examiner* — Arnel C Lavarias
(74) *Attorney, Agent, or Firm* — Novak Druce Connolly Bove + Quigg LLP (57) ABSTRACT

An optical lens includes a lens body and an anti-reflection film. The lens body includes an optically effective portion and a peripheral portion surrounding the optically effective portion. The optically effective portion is configured for transmitting light therethrough. The optically effective portion has a first surface and an opposite second surface. The first and second surfaces each have a curvature of greater than zero. The anti-reflection film is formed on the first surface of the optically effective portion. A reflectivity of the anti-reflection film to light rays has wavelengths in a range from about 400 nm to about 850 nm being lower than 2%.

16 Claims, 7 Drawing Sheets

OPTICAL LENS WITH ANTI-REFLECTION FILM AND LENS MODULE

BACKGROUND

1. Technical Field

The present disclosure relates to an optical lens with an anti-reflection film and a lens module having the optical lens.

2. Description of Related Art

Lens modules may include at least one lens and a filter positioned at an image side of the lens. The filter may include a transparent substrate and an infrared filtering film formed on an object side of the transparent substrate. The filter is for reflecting infrared light rays while allowing the passage of visible light rays. However, about 5% or more of visible light rays are also reflected by the infrared filtering film. The reflected visible light rays form a glare in the image after multiple reflections in the lens module.

Figure 6:
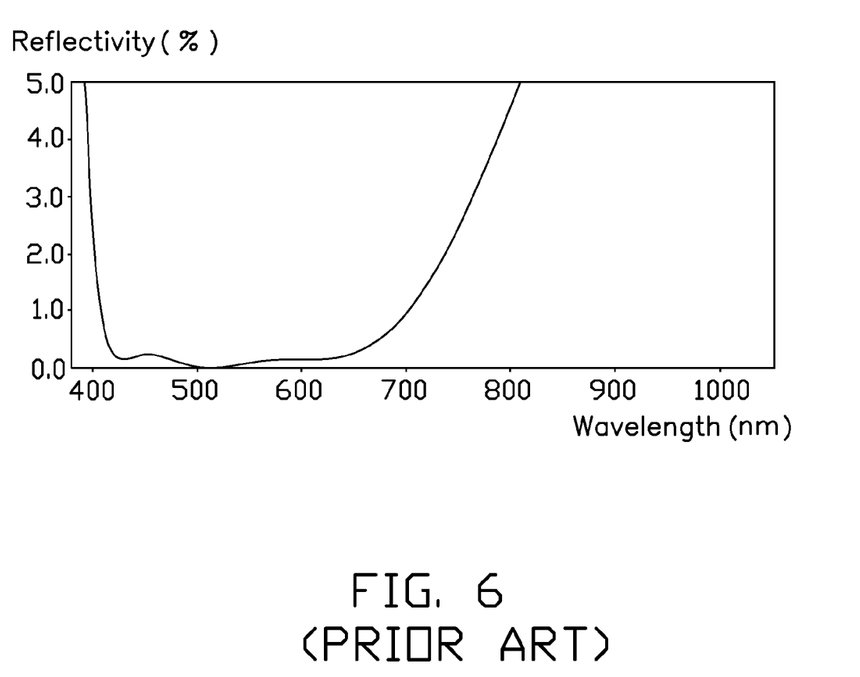
FIG. 6 is a reflection spectrum chart of a conventional anti-reflection film.
Figure 7:
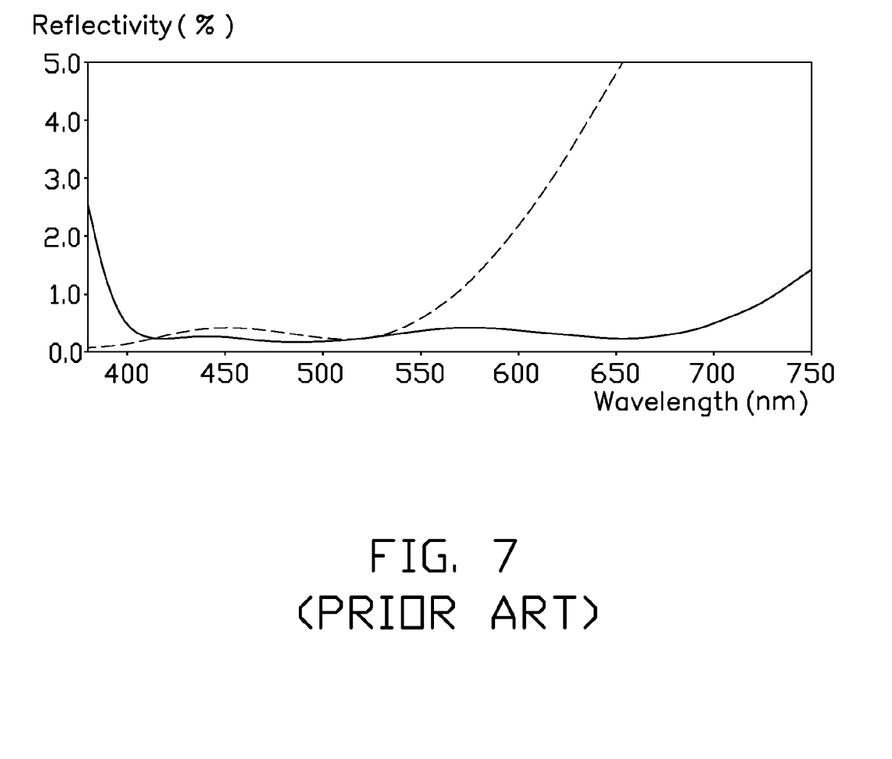
FIG. 7 is a reflection spectrum chart of a conventional optical lens having the conventional anti-reflection film of FIG. 6.

An anti-reflection film is formed on a surface of an optical lens of the lens module for reducing the glare in the lens module. FIG. 6, illustrates a reflection spectrum chart of a conventional anti-reflection film. The optical lens includes an optically effective portion and a peripheral portion surrounding the optically effective portion. Surfaces of the optically effective portion are generally spherical or aspheric surfaces. When the anti-reflection film is applied to the surface of the optical lens, the reflection spectrum chart of the anti-reflection film in the center region of the optically effective portion is different from that in the periphery region of the optically effective portion. FIG. 7, illustrates a reflection spectrum chart of the anti-reflection film formed on the optically effective portion of the optical lens. The solid line represents a reflection spectrum of the anti-reflection film in the center region of the optically effective portion, and the dashed line represents a reflection spectrum of the anti-reflection film in the periphery region of the optically effective portion. It is seen that, a reflectivity of the anti-reflection film in the periphery region of the optically effective portion is higher than 5% when a wavelength of light rays striking on the anti-reflection film are greater than 650 nanometers (nm), giving rise to glare during image capture.

Therefore, it is desirable to provide an optical lens with an anti-reflection film and a lens module having the same, which can overcome the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Embodiments of the disclosure will now be described in detail, with reference to the accompanying drawings.

Figure 1:
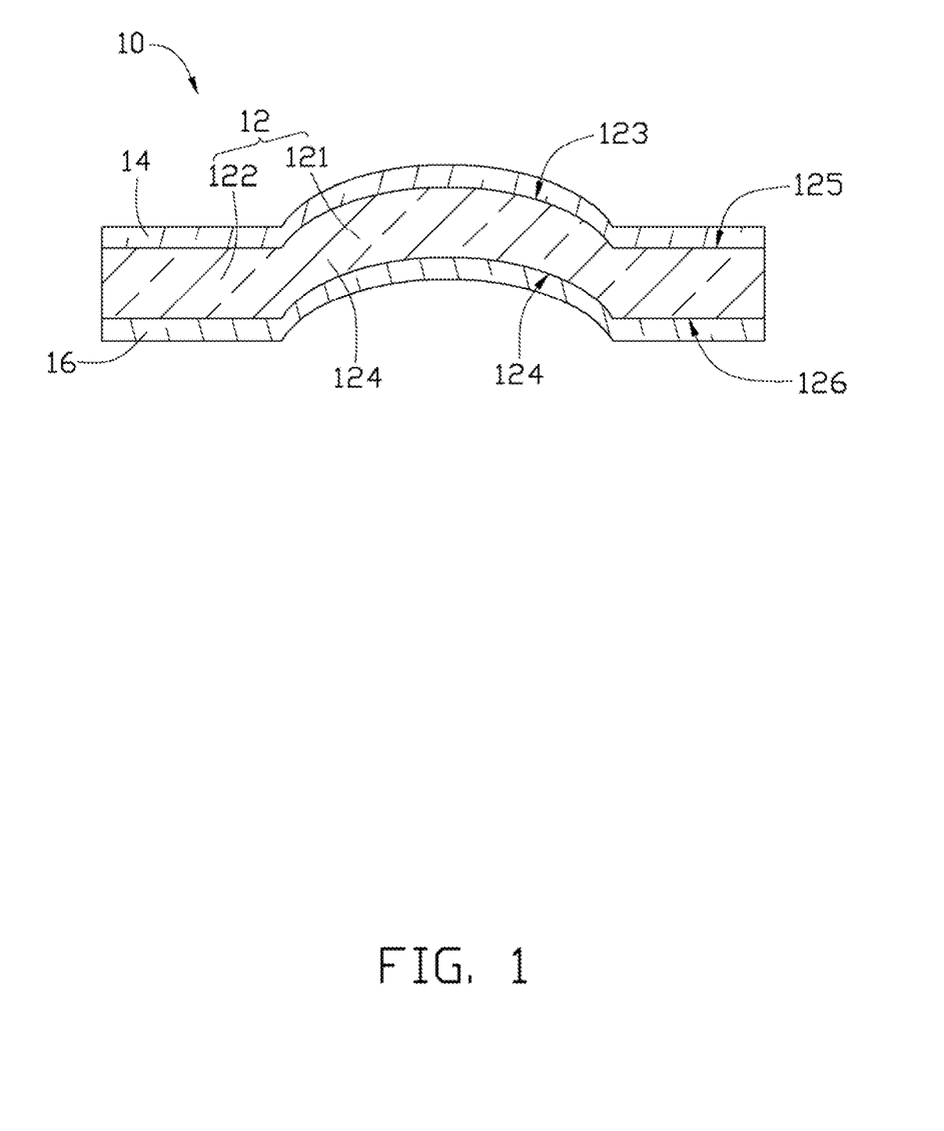
FIG. 1 is a schematic, cross-section view of an optical lens according to a first exemplary embodiment, the optical lens comprising a lens body and an anti-reflection film coating on the lens body.

FIG. 1, is an optical lens 10 in accordance to a first exemplary embodiment. The optical lens 10 includes a lens body 12, a first anti-reflection film 14 and a second anti-reflection film 16. The lens body 12 is comprised of plastic or glass. The lens body 12 includes an optically effective portion 121 and a peripheral portion 122 surrounding the optically effective portion 121. The optically effective portion 121 is configured for transmitting light therethrough. The optically effective portion 121 of the lens body 12 includes a first surface 123 and a second surface 124 facing away from the first surface 123. The peripheral portion 122 includes a first surface 125 connecting to and surrounding the first surface 123, and a second surface 126 connecting to and surrounding the second surface 124. The first surface 123 is a convexly aspheric surface, the second surface 124 is a concave aspheric surface, and the first and second surfaces 123 and 124 are aligned with each other. The first surface 125 and the second surface 126 are planar and parallel to each other. In alternative embodiments, the optically effective portion 121 can also be biconvex or biconcave. The first and second surfaces 123 and 124 each have a curvature of greater than zero. In another alternative embodiment, the first surface 123 and the second surface 124 can also be spherical.

The first anti-reflection film 14 is formed on the first surface 123 of the optically effective portion 121 and the first surface 125 of the peripheral portion 122, and covers the entire first surfaces 123 and 125. The second anti-reflection film 16 is formed on the second surface 123 of the optically effective portion 121 and the second surface 126 of the peripheral portion 122, and covers the entire second surfaces 124 and 126.

Each of the first and second anti-reflection films 14 and 16 includes a plurality of high refractive index layers and a plurality of low refractive index layers alternately stacked one on another. In this embodiment, each of the first and second anti-reflection film 14 and 16 includes four high refractive index layers and four low refractive index layers alternately stacked one on another. A material of the high refractive index layers is Titanium dioxide ($TiO_2$) with a refractive index of 2.41, and a material of the low refractive index layers is silicon dioxide ($SiO_2$) with a refractive index of 1.47. The material and thickness of each layer of each of the first and second anti-reflection films 14 and 16 are shown in Table 1.

TABLE 1

| Layers | Material | Thickness (nm) |
| --- | --- | --- |
| First layer | $TiO_2$ | 8.84 |
| Second layer | $SiO_2$ | 46.07 |
| Third layer | $TiO_2$ | 27.57 |
| Fourth layer | $SiO_2$ | 20.39 |
| Fifth layer | $TiO_2$ | 75.34 |
| Sixth layer | $SiO_2$ | 13.68 |
| Seventh layer | $TiO_2$ | 29.06 |
| eighth layer | $SiO_2$ | 100.33 |

Figure 2:
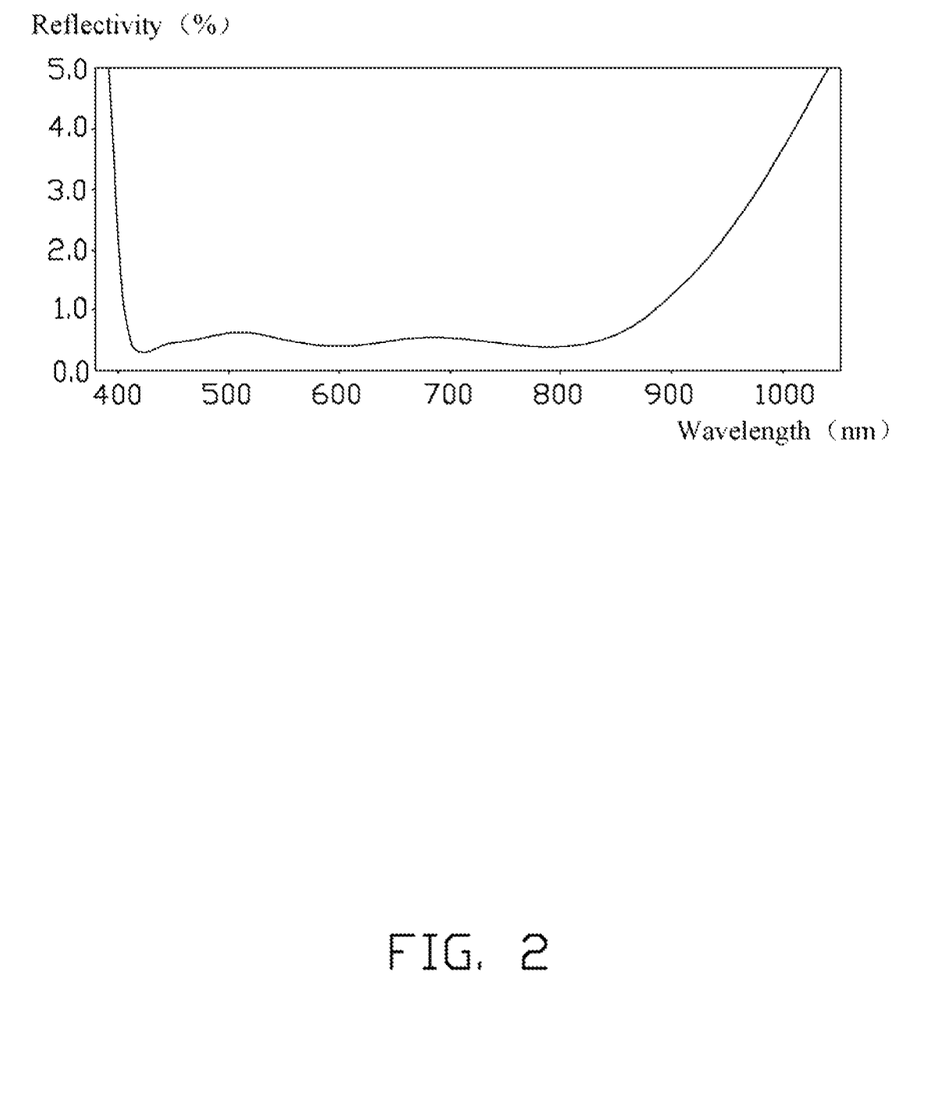
FIG. 2 is a reflection spectrum chart of the anti-reflection film in FIG. 1.
Figure 3:
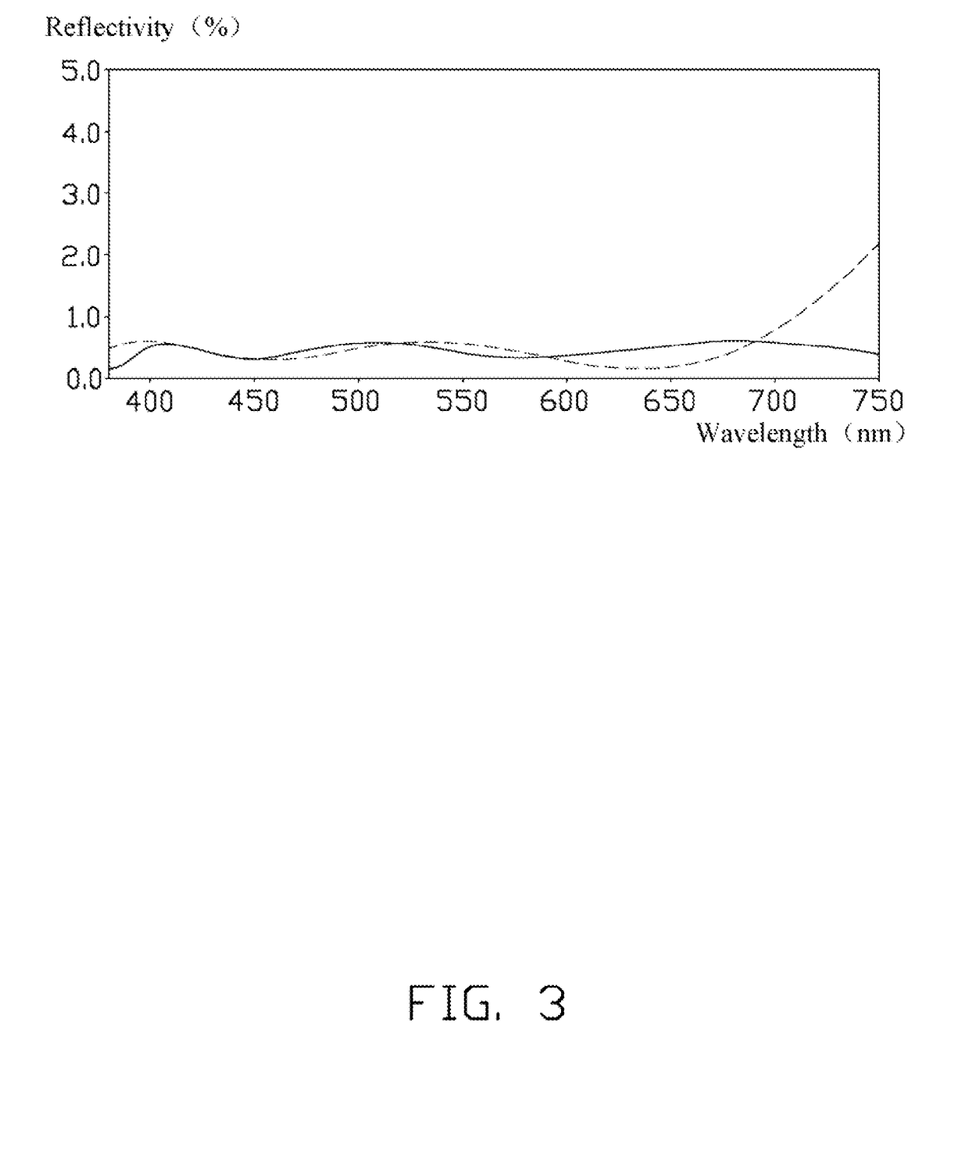
FIG. 3 is a reflection spectrum chart of the lens body in FIG. 1.

FIG. 2 illustrates a reflection spectrum chart of each of the first and second anti-reflection films 14 and 16. It is seen from FIG. 2 that the reflectivity of each of the first and second anti-reflection films 14 and 16 to light rays having wavelengths in a range from about 400 nm to about 850 nm is lower than about 2%. FIG. 3, illustrates a reflection spectrum chart of each of the first and second anti-reflection films 14 and 16 formed on the optically effective portion 121 of the lens body 12. The solid line represents a reflection spectrum of each of the first and second anti-reflection films 14 and 16 in the center region of the optically effective portion 121, and the dashed line represents a reflection spectrum of each of the first and second anti-reflection films 14 and 16 in the periphery region of the optically effective portion 121. It is seen that, a reflectivity of each of the first and second anti-reflection films 14 and 16 to light rays having wavelengths in a range from about 420 nm to about 650 nm in the effective region and periphery region of the optically effective portion 121 is lower than about 2%. For a general camera, the sensed light rays almost all have wavelengths in a range from about 420 nm to about 650 nm. Thus the glare in a camera having the optical lens 10 is avoided or at least mitigated.

In alternative embodiments, the high refractive index layers can also be selected the group consisting of hafnium oxide (HfO) with a refractive index of 1.85, tantalum oxide ($Ta_2O_5$) with a refractive index of 2.2, niobium oxide ($Nb_2O_5$) with a refractive index of 2.19, zinc sulfide (ZnS) with a refractive index of 2.27, silicon (Si) with a refractive index of 3.5, germanium (Ge) with a refractive index of 4.0, and lead tellurium (PbTe) with a refractive index of 5.0. In another alternative embodiment, one of the first and second anti-reflection films 14 and 16 can be omitted.

Figure 4:
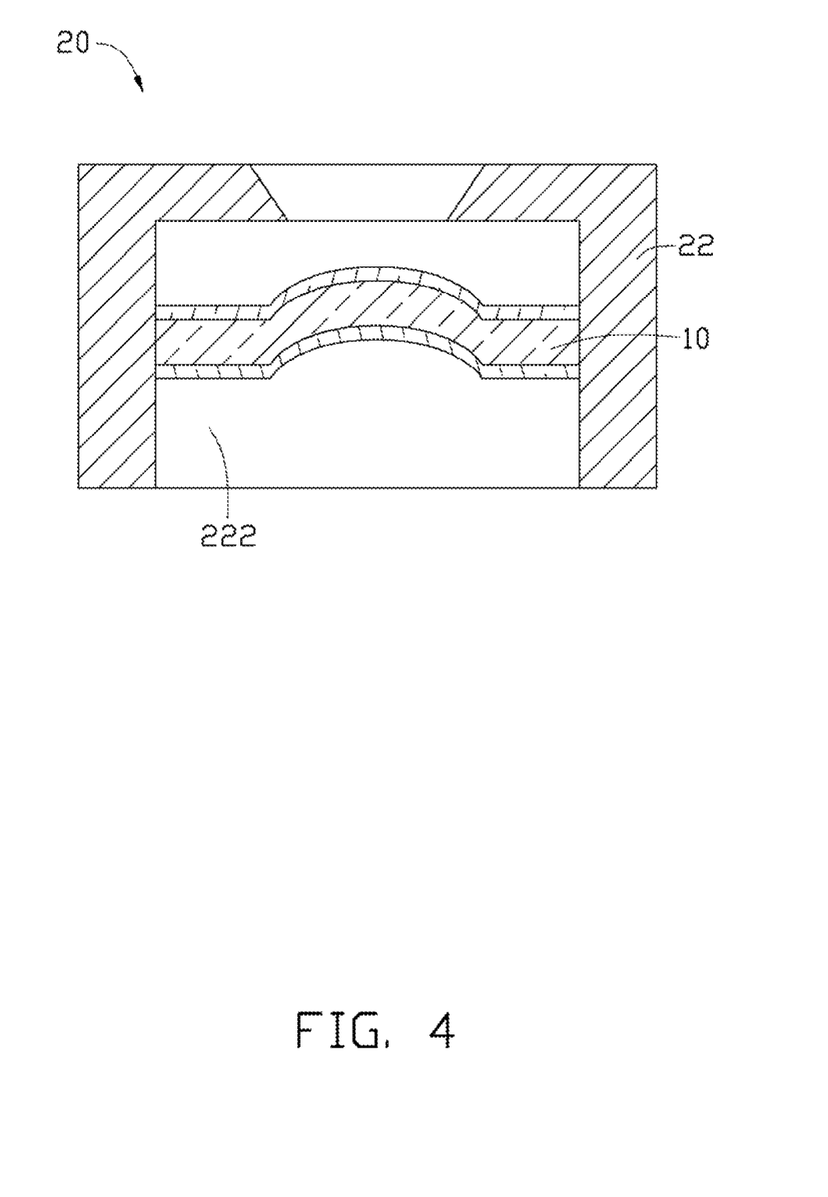
FIG. 4 is a schematic, cross-section view of a lens module according to a second exemplary embodiment.

FIG. 4, illustrates a lens module 20 according to a second exemplary embodiment. The lens module 20 includes a lens barrel 22 and the optical lens 10. The lens barrel 22 is cylindrical and defines a receiving cavity 222. The optical lens 10 is received in the receiving cavity 222.

For the first and second surfaces 123 and 124 of the lens body 12 with a higher curvature, each of the first and second anti-reflection film 14 and 16 can anti-reflect light beams with wider frequency band, thereby the reflectivity of each of the first and second anti-reflection film 14 and 16 on the optically effective portion 121 and peripheral portion 122 to light rays having wavelengths in a range from about 420 nm to about 650 nm is lower than about 2%. Referring to Table 2, the material and thickness of each layer of each of the first and second anti-reflection films 14 and 16 according to a third exemplary embodiment are shown in Table 2.

TABLE 2

| Layers | Material | Thickness (nm) |
|---|---|---|
| First layer | $TiO_2$ | 13.80 |
| Second layer | $SiO_2$ | 43.70 |
| Third layer | $TiO_2$ | 37.65 |
| Fourth layer | $SiO_2$ | 15.97 |
| Fifth layer | $TiO_2$ | 90.79 |
| Sixth layer | $SiO_2$ | 18.81 |
| Seventh layer | $TiO_2$ | 30.13 |
| eighth layer | $SiO_2$ | 109.95 |

Figure 5:
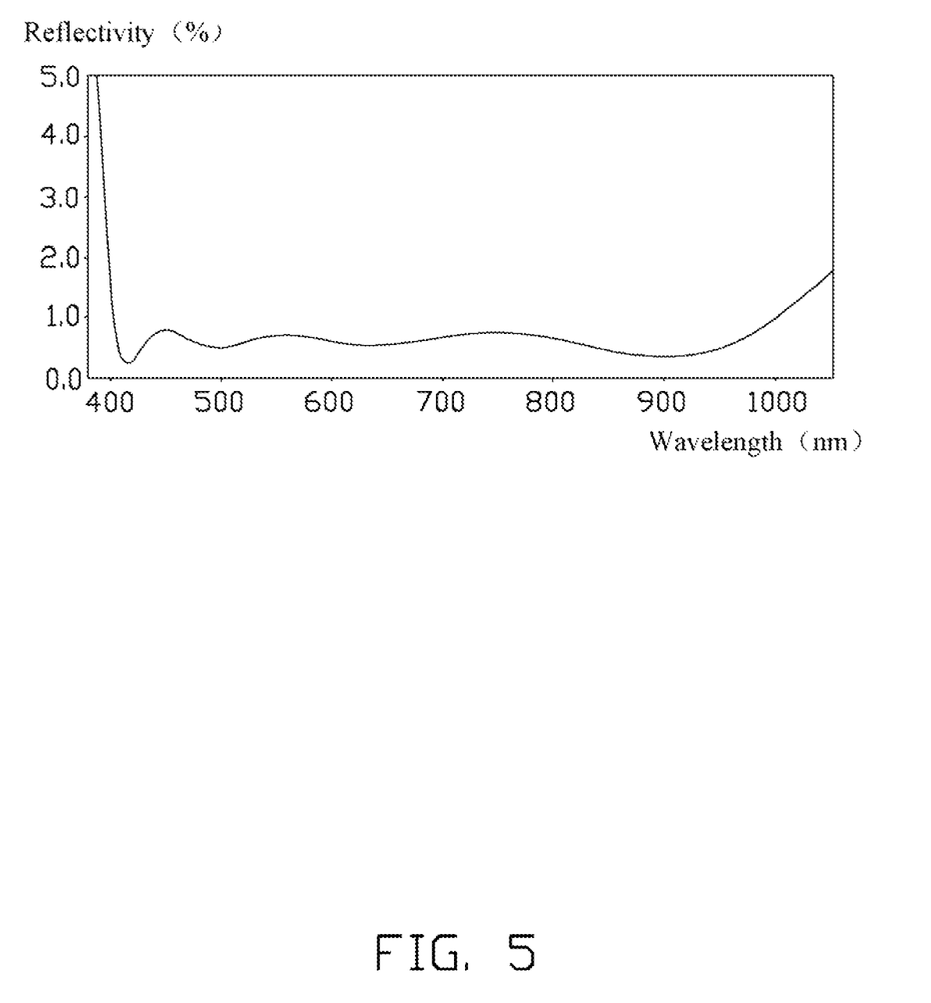
FIG. 5 is a reflection spectrum chart of an anti-reflection film according to another anti-reflection film.

FIG. 5 illustrates a reflection spectrum chart of each of the first and second anti-reflection films 14 and 16 according to the third exemplary embodiment. It is seen from FIG. 5 that the reflectivity of each of the first and second anti-reflection films 14 and 16 to light rays having wavelengths in a range from about 400 nm to about 1000 nm is lower than about 2%.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An optical lens, comprising:
   a lens body comprising an optically effective portion and a peripheral portion surrounding the optically effective portion, the optically effective portion being configured for transmitting light therethrough, the optically effective portion having a first surface and an opposite second surface, the first and second surfaces each having a curvature of greater than zero; and
   a first anti-reflection film formed on the first surface of the optically effective portion, a reflectivity of the first anti-reflection film to light rays having wavelengths in a range from about 400nm to about 850nm being lower than 2%, wherein the first anti-reflection film comprises a plurality of high refractive index layers and a plurality of low refractive index layers alternately stacked one on another, a material of the high refractive index layers is $TiO_2$, a material of the low refractive index layers is $SiO_2$, the first anti-reflection film comprises a first layer of $TiO_2$ having a thickness of 8.84nm, a second layer of $SiO_2$ having a thickness of 46.07 nm, a third layer of $TiO_2$ having a thickness of 27.57 nm, a fourth layer of $SiO_2$ having a thickness of 20.39 nm, a fifth layer of $TiO_2$ having a thickness of 75.34 nm, a sixth layer of $SiO_2$ having a thickness of 13.68 nm, a seventh layer of $TiO_2$ having a thickness of 28.06 nm, and an eighth layer of $SiO_2$ having a thickness of 100.33nm stacked one on another.

2. The optical lens of claim 1, wherein the first and second surfaces are spherical or aspheric surfaces.

3. The optical lens of claim 1, wherein the peripheral portion comprises a first surface connected to and surrounding the first surface of the optically effective portion, and a second surface connected to and surrounding the second surface of the optically effective portion, and the first anti-reflection film covers the first surface of the peripheral portion.

4. The optical lens of claim 3, further comprising a second anti-reflection film formed on the second surface of the optically effective portion, a reflectivity of the second anti-reflection film to light rays having wavelengths in a range from about 400nm to about 850nm being lower than 2%.

5. The optical lens of claim 4, wherein the second anti-reflection film covers the second surface of the peripheral portion.

6. A lens module, comprising:
   a lens barrel defining a receiving cavity therein; and
   an optical lens received in the receiving cavity, the optical lens comprising:
      a lens body comprising an optically effective portion and a peripheral portion surrounding the optically effective portion, the optically effective portion being configured for transmitting light therethrough, the optically effective portion having a first surface and an opposite second surface, the first and second surfaces each having a curvature of greater than zero; and
      a first anti-reflection film formed on the first surface of the optically effective portion, a reflectivity of the first anti-reflection film to light rays having wavelengths in a range from about 400nm to about 850nm being lower than 2%, wherein the first anti-reflection film comprises a plurality of high refractive index layers and a plurality of low refractive index layers alternately stacked one on another, a material of the high refractive index layers is $TiO_2$, a material of the low refractive index layers is $SiO_2$, the first anti-reflection film comprises a first layer of $TiO_2$ having a thickness of 8.84nm, a second layer of $SiO_2$ having a thickness of 46.07 nm, a third layer of $TiO_2$ having a thickness of 27.57 nm, a fourth layer of $SiO_2$ having a thickness of 20.39 nm, a fifth layer of $TiO_2$ having a thickness of 75.34 nm, a sixth layer of $SiO_2$ having a thickness of 13.68 nm, a seventh layer of $TiO_2$ having a thickness of 28.06 nm, and an eighth layer of $SiO_2$ having a thickness of 100.33nm stacked one on another.

7. The lens module of claim 6, wherein the first and second surfaces are spherical or aspheric surfaces.

8. The lens module of claim 6, wherein the peripheral portion comprises a first surface connected to and surrounding the first surface of the optically effective portion, and a second surface connected to and surrounding the second surface of the optically effective portion, and the first anti-reflection film covers the first surface of the peripheral portion.

9. The lens module of claim 8, further comprising a second anti-reflection film formed on the second surface of the optically effective portion, a reflectivity of the second anti-reflection film to light rays, having wavelengths in a range from about 400nm to about 850nm, being lower than 2%.

10. The lens module of claim 9, wherein the second anti-reflection film covers the second surface of the peripheral portion.

11. An optical lens comprising:
a lens body comprising an optically effective portion and a peripheral portion surrounding the optically effective portion, the optically effective portion being configured for transmitting light therethrough and having a first surface and an opposite second surface, the first and second surfaces each having a curvature of greater than zero; and
a first anti-reflection film formed on the first surface of the optically effective portion, a reflectivity of the first anti-reflection film to light rays having wavelengths in a range from about 400nm to about 850nm, being lower than 2%, wherein the first anti-reflection film comprises a plurality of high refractive index layers and a plurality of low refractive index layers alternately stacked one on another, the high refractive index layers is made of TiO2, the low refractive index layers is made of SiO2, the first anti-reflection film comprises a first layer of TiO2 having a thickness of 13.80 nm, a second layer of SiO2 having a thickness of 43.70 nm, a third layer of TiO2 having a thickness of 37.65 nm, a fourth layer of SiO2 having a thickness of 15.97 nm, a fifth layer of TiO2 having a thickness of 90.79 nm, a sixth layer of SiO2 having a thickness of 18.81 nm, a seventh layer of TiO2 having a thickness of 30.13 nm, and an eighth layer of SiO2 having a thickness of 109.95 nm stacked one on another.

12. The optical lens of claim 11, wherein a reflectivity of the first anti-reflection film to light rays having wavelengths in a range from about 400nm to about 1000nm is lower than 2%.

13. The optical lens of claim 11, wherein the first and second surfaces are spherical or aspheric surfaces.

14. The optical lens of claim 11, wherein the peripheral portion comprises a first surface connected to and surrounding the first surface of the optically effective portion, and a second surface connected to and surrounding the second surface of the optically effective portion, and the first anti-reflection film covers the first surface of the peripheral portion.

15. The optical lens of claim 14, further comprising a second anti-reflection film formed on the second surface of the optically effective portion, a reflectivity of the second anti-reflection film to light rays, having wavelengths in a range from about 400nm to about 850nm, being lower than 2%.

16. The optical lens of claim 15, wherein the second anti-reflection film covers the second surface of the peripheral portion.

* * * * *